(12) United States Patent
Van Faassen

(10) Patent No.: US 10,723,557 B2
(45) Date of Patent: Jul. 28, 2020

(54) CONVEYOR BELT

(71) Applicant: Frans Bakker Beheer B.V., Hengelo (NL)

(72) Inventor: Willem Van Faassen, Hengelo (NL)

(73) Assignee: Frans Bakker Beheer B.V., Hengelo (NL)

(*) Notice: Subject to any disclaimer, the term of this patent is extended or adjusted under 35 U.S.C. 154(b) by 0 days.

(21) Appl. No.: 16/305,597

(22) PCT Filed: May 9, 2017

(86) PCT No.: PCT/EP2017/061021
§ 371 (c)(1),
(2) Date: Nov. 29, 2018

(87) PCT Pub. No.: WO2017/215846
PCT Pub. Date: Dec. 21, 2017

(65) Prior Publication Data
US 2019/0308816 A1 Oct. 10, 2019

(30) Foreign Application Priority Data
Jun. 13, 2016 (EP) .................................. 16174220

(51) Int. Cl.
*B65G 17/06* (2006.01)
*B65G 23/06* (2006.01)

(52) U.S. Cl.
CPC ........... *B65G 17/063* (2013.01); *B65G 23/06* (2013.01); *B65G 2207/24* (2013.01)

(58) Field of Classification Search
CPC .... B65G 17/063; B65G 23/06; B65G 2207/24
See application file for complete search history.

(56) References Cited

U.S. PATENT DOCUMENTS 7,762,388 B2 * 7/2010 Lago .................... B65G 17/063
198/778
8,302,765 B2 * 11/2012 Lago .................... B65G 17/064
198/778

(Continued)

FOREIGN PATENT DOCUMENTS

DE  202006004102 U1  6/2006
EP  1281641 A1  2/2003

(Continued)

*Primary Examiner* — Gene O Crawford
*Assistant Examiner* — Keith R Campbell
(74) *Attorney, Agent, or Firm* — The Webb Law Firm

(57) ABSTRACT

A conveyor belt includes a repeating interconnected arrangement of: rods spaced apart in a longitudinal direction and each extending in a lateral direction and connecting links arranged on both ends of the rods. Each link includes a nose section extending in lateral direction and two legs arranged on either side of the nose section, the legs extending in longitudinal direction. The nose section and the two legs provide a U-shaped structure. Laterally aligned first openings are arranged in each of the legs adjacent to the nose section for reception of a rod. Laterally aligned second openings are arranged in each of the legs adjacent the free ends of the legs. The first openings of a first link are aligned with the second openings of a second link for reception of a rod thereinto.

8 Claims, 3 Drawing Sheets

(56) References Cited

U.S. PATENT DOCUMENTS

| | | | |
|---|---|---|---|
| 2004/0011627 A1 | 1/2004 | Palmaer et al. | |
| 2010/0282577 A1* | 11/2010 | Rettore | B65G 17/064 |
| | | | 198/851 |
| 2013/0118867 A1 | 5/2013 | Salsone et al. | |
| 2015/0353285 A1* | 12/2015 | Matsuzaki | B65G 17/063 |
| | | | 198/778 |
| 2018/0072504 A1* | 3/2018 | Perdue | B65G 17/064 |

FOREIGN PATENT DOCUMENTS

| | | |
|---|---|---|
| EP | 1510478 A1 | 3/2005 |
| WO | 2005021408 A1 | 3/2005 |
| WO | 2005080234 A1 | 9/2005 |

\* cited by examiner

CONVEYOR BELT

Cross-reference to related Applications

This application is the United States national phase of International Application No. PCT/EP2017/061021 filed May 9, 2017, and claims priority to European Patent Application No. 16174220.0 filed Jun. 13, 2016, the disclosures of which are hereby incorporated in their entirety by reference.

BACKGROUND OF THE INVENTION

Field of the Invention

The invention relates to a conveyor belt comprising a repeating interconnected arrangement of:
- rods spaced apart in a longitudinal direction and each extending in a lateral direction;
- connecting links arranged on both ends of the rods, wherein each link comprises a nose section extending in lateral direction and two legs arranged on either side of the nose section, the legs extending in longitudinal direction, wherein the nose section and the two legs provide a U-shaped structure, wherein laterally aligned first openings are arranged in each of the legs adjacent to the nose section for reception of a rod, wherein laterally aligned second openings are arranged in each of the legs adjacent the free ends of the legs, and wherein the first openings of a first link are aligned with the second openings of a second link for reception of a rod thereinto.

Description of Related Art

Such a conveyor belt is for example known from WO 2005 021408. The drive system for this prior art conveyor belt comprises two sprocket wheels arranged on opposite sides of the links and below the rods of the conveyor belt, when seen in lateral direction. The teeth of the sprocket wheels extend into holes in the legs of the links in order to drive the conveyor belt.

As the sprocket wheels are arranged on opposite sides a transmission is needed to drive both wheels. Furthermore, when this conveyor belt is to be used as a spiral conveyor belt, the drive system cannot easily be used to drive different tiers of the conveyor belt without requiring complex transmissions.

Furthermore, two sprocket wheels arranged on opposite sides of the links need to be present to avoid torque on the rods, which would cause the rods to bend.

EP 1281641 discloses a conveyor belt also according to the preamble, wherein a drive sprocket wheel is arranged adjacent the conveyor belt and engages on cams arranged on the ends of the rods. Such a drive system causes torque on the rods, as the tension forces in the conveyor belt are transmitted through the interconnected links and the drive force of the sprocket wheel is applied at a distance from the line with the tension forces. As a result the rods will be bent.

The know belts can be embodied in metal, plastic or a combination of plastic and metal. For example, the links could be integrated with deck elements for supporting goods between the interconnected links onto the rods. Such integrated link-deck elements are typically made of plastic, while the rods connecting the link-deck elements are either made of metal or plastic.

Summary of the Invention

The invention is directed to either metal, plastic or metal/plastic conveyor belts and not specifically limited to the material used.

The U-shaped structure of the links should furthermore not be interpreted as limited to a U-shaped structure with parallel legs, but does also comprise under the invention U-shaped structures in which the legs diverge and even would tend to a more V-shaped structure.

It is an object of the invention to reduce the above mentioned disadvantages.

This object is achieved with a conveyor belt according to the preamble, which is characterized by a first protrusion, for engagement with a first sprocket wheel, which first protrusion is arranged to the nose section of a link, wherein the first protrusion extends in a vertical direction perpendicular to the longitudinal and lateral direction.

With the invention, the protrusion is provided on the nose section, which coincides with the line along which the tension forces are transmitted by the interconnected links. So, when the protrusions are driven by a sprocket wheel, the drive forces and the tension forces are applied in the same plane perpendicular to the rods, such that no torque is caused in the rods.

The sprocket wheel will partially run over the links, when engaging on the protrusions on the nose section, such that tenting of the links is mainly prevented. By arranging suitable guides around the links the slight tenting can be further reduced.

A preferred embodiment of the conveyor belt according to the invention further comprises a second protrusion, for engagement with a second sprocket wheel, wherein the second protrusion is arranged on the opposite side, seen in the vertical direction, to the nose section of each link and wherein the second protrusion extends in the vertical direction.

With the second protrusion on the links of the conveyor belt, the links can be driven by sprocket wheels arranged both above and below the rods, such that the resulting drive force is in the plane of the rods, such that tenting of the links is prevented.

An additional advantage is that both sprocket wheels can be arranged coaxially, such that only a single drive shaft is needed to drive the links via the first and second protrusions.

In a further preferred embodiment of the conveyor belt according to the invention, the first or first and second protrusion extends from the nose section along the leg adjacent to the middle of the conveyor belt.

As a result, the first and/or second protrusion have an L-shape with strengthens the part of the protrusion on the nose section, allowing for larger driving forces to be applied to the protrusions.

The part of the protrusion extending along the length of the leg can also be used to abut against a guide rail. Especially in bends of the belt, it is known to have the inner links abut a guide rail, while the tension in the belt is transferred in the outer links. This results in a pressure force in the rods, which could lead to bending of the rods. When the L-shaped protrusion of the outer links abuts against a guide rail, then the rods do not need to transfer the forces to the inner links. As a result, the diameter of the rods could be reduced resulting in a lighter conveyor belt and lower manufacturing costs.

In another embodiment of the conveyor belt according to the invention the first or first and second protrusion extends from the nose section in lateral direction away from the middle of the conveyor belt. By extending the length of the protrusion on the nose section towards the outside of the conveyor belt, the teeth of the sprocket wheel will be longer in contact with the protrusions. So, when the contact time of a tooth with the protrusion is about to end, the next tooth of the same sprocket wheel will already be in contact with the protrusion of the next link. This results in a smoother drive of the conveyor belt.

In a further preferred embodiment of the conveyor belt according to the invention the first or first and second protrusions are arranged at a regular interval to links, for example to each link, on a first lateral side of the conveyor belt. The protrusion would preferably be arranged on each link on at least one side of the conveyor belt. However, the protrusions could also be arranged every second or third link, depending on the drive force required to be transferred and the allowable size for the drive sprocket. With less protrusions along the length of the conveyor belt, a larger sprocket wheel would be necessary to be in engagement with at least one protrusion.

In yet another embodiment of the conveyor belt according to the invention the first openings are slot-shaped to allow relative movement between adjacent links in longitudinal direction.

The slot-shaped openings allow for the links to slide partially into each other, in a nested configuration, such that the length of the chain of links is reduced and the conveyor belt can be guided around a bend or corner. This allows for the conveyor belt according to the invention to be used as a spiral conveyor belt for a low-tension application or the like.

In still a further preferred embodiment of the conveyor belt according to the invention the links are shaped out of plate material and the nose section, the two legs and the first and/or second protrusion have a uniform thickness.

Typically, the links can be stamped out of plate material and then be bend into the final shape of the link. This allows for low manufacturing costs for the links of the conveyor belt according to the invention, while still a protrusion is provided for driving the links.

The invention further relates to a combination of a conveyor belt according to the invention and drive means, wherein the drive means comprise at least one sprocket wheel, which sprocket wheel is in engagement with the first protrusions of the links of the conveyor belt and wherein the axle of the sprocket wheel is arranged parallel to the vertical direction and wherein the sprocket wheel is arranged below, seen in lateral direction, the rods of the conveyor belt.

It should be clear to a person skilled in the art, that the arrangement of the sprocket wheel below, seen in lateral direction, the rods of the conveyor belt, can also be reversed such that the sprocket wheel is above the rods of the conveyor belt.

In a further embodiment of the combination according to the invention and a conveyor belt according to the invention, the drive means further comprise a second sprocket wheel, which second sprocket wheel is in engagement with the second protrusions of the links, wherein the axle of the second sprocket wheel is coaxial with the axle of the first sprocket wheel and wherein the sprocket wheel is arranged above, seen in lateral direction, the rods of the conveyor belt.

BRIEF DESCRIPTION OF THE DRAWINGS

These and other features of the invention will be elucidated in conjunction with the accompanying drawings.

DESCRIPTION OF THE INVENTION

Figure 1:
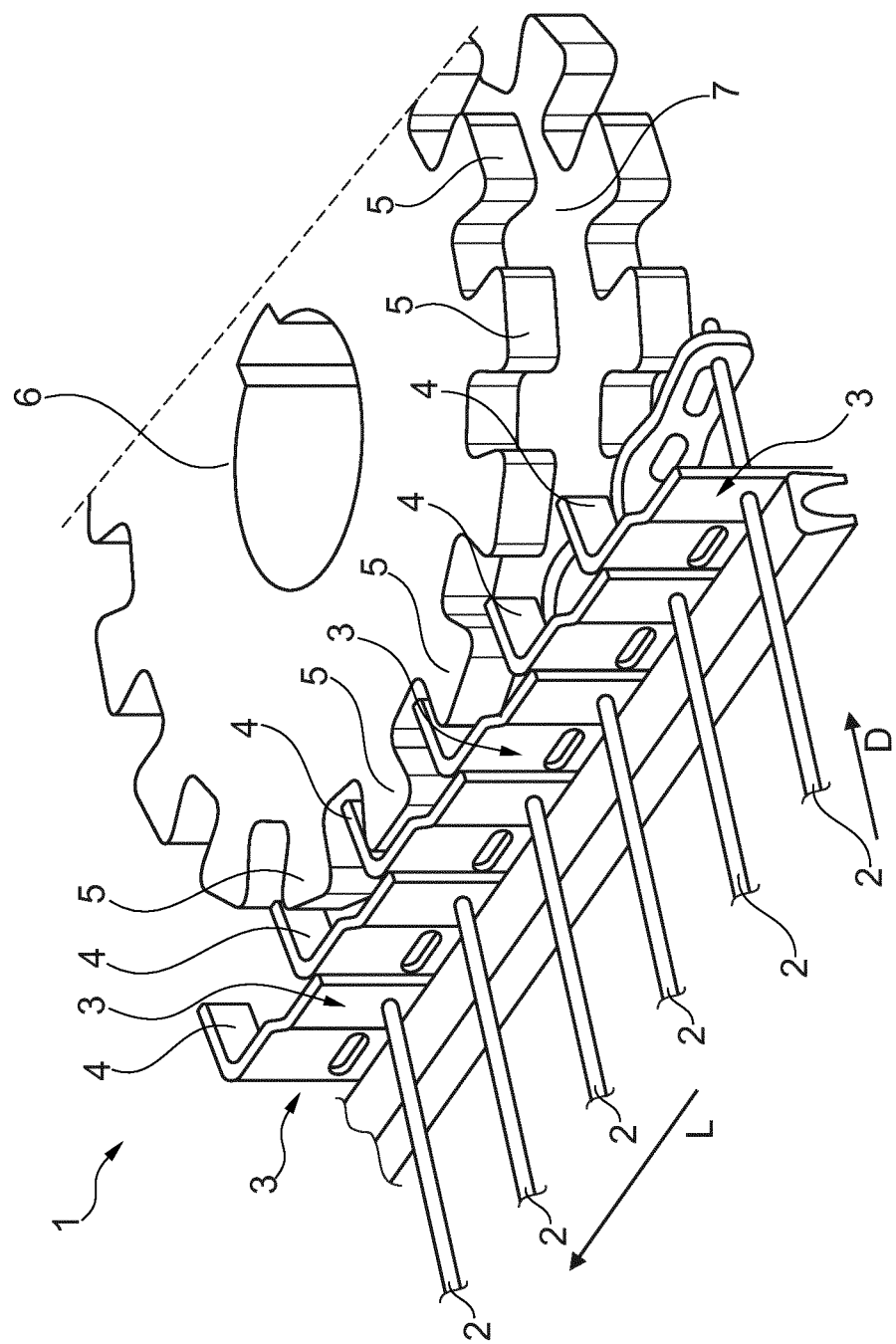
FIG. 1 shows a perspective view of an embodiment of a combination according to the invention.
Figure 2:
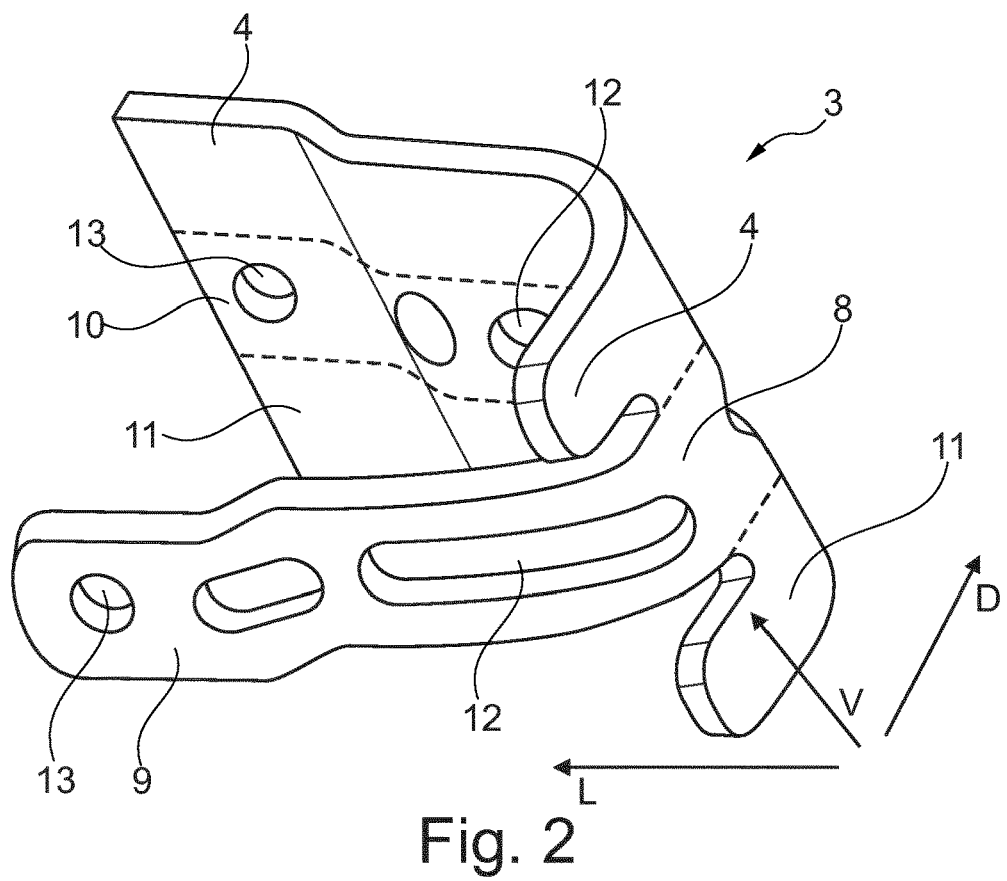
FIG. 2 shows a perspective view of a link of the conveyor belt according to FIG. 1.

FIG. 1 shows a perspective view of an embodiment of a combination 1 according to the invention. The combination 1 has a conveyor belt with rods 2 spaced apart in longitudinal direction L. The rods 2 extend in lateral direction D with on both ends links 3 interconnected by the rods 2.

Each link 3 has a protrusion 4 which is engaged by the teeth 5 of a sprocket wheel 6. A second sprocket wheel 7 is coaxially arranged with the sprocket wheel 6.

Each link 3 has a nose section 8 extending in lateral direction D. On both ends of the nose section 8 a leg 9, 10 is extending in longitudinal direction, such that a U-shape is formed by the nose section 8 and legs 9, 10.

A first protrusion 4 is arranged to and above the nose section 8. This first protrusion 4 extends in vertical direction V. The protrusion 4 has furthermore an L-shape extending along the leg 10.

A second protrusion 11, also having a L-shape, is arranged to and below the nose section 8 and also extends along the leg 11.

The legs 9, 10 have adjacent to the nose section 8 first slot-shaped openings 12 and near the free ends of the legs 9, 10 second openings 13. Adjacent links 3 are interconnected by a rod 2, which extends through the first openings 12 of the first link 3 and through the second openings 13 of the second link 3.

Figure 3:
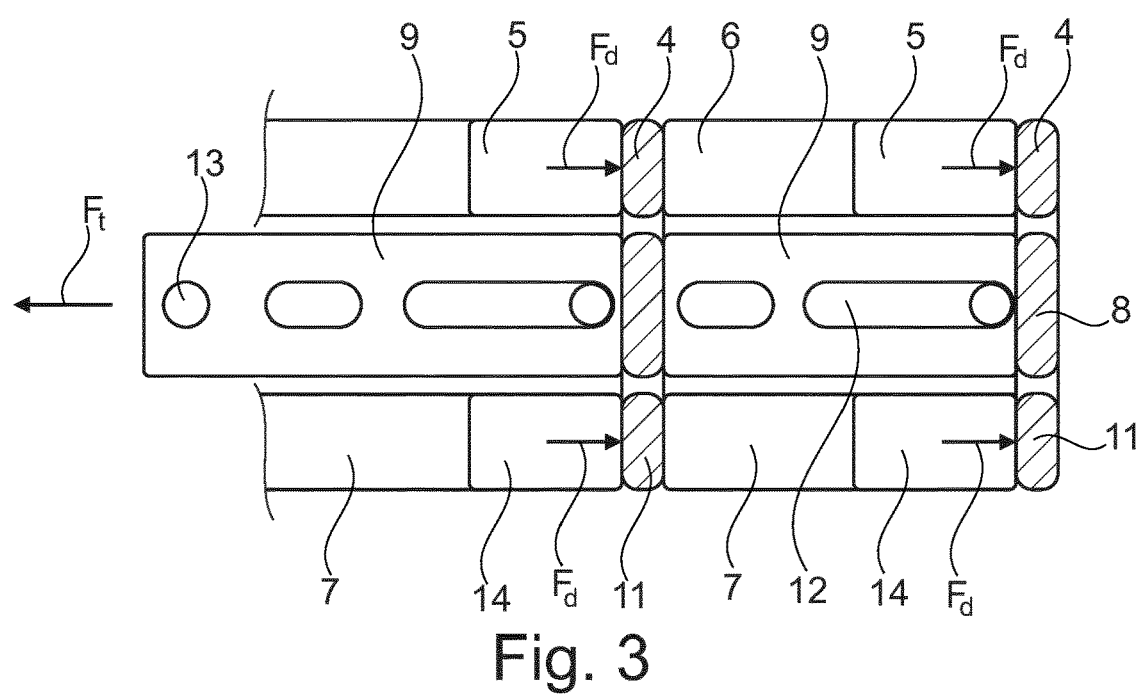
FIG. 3 shows a lateral cross-sectional view of the conveyor belt according to FIG. 1.

FIG. 3 shows furthermore the teeth 5 of the first sprocket wheel 6 being in contact with the first protrusions 4. The teeth 14 of the second sprocket wheel 7 are also in contact with the second protrusions 11. So, when both sprocket wheels 6, 7 are driven, a drive force $F_d$ is exerted on both the first protrusions 4 and the second protrusions 11. The resulting drive force $F_d$ will thus be in the plane of the drive rods 2, the same plane as the tension forces $F_t$ are transmitted by the interconnected links 3.

Figure 4:
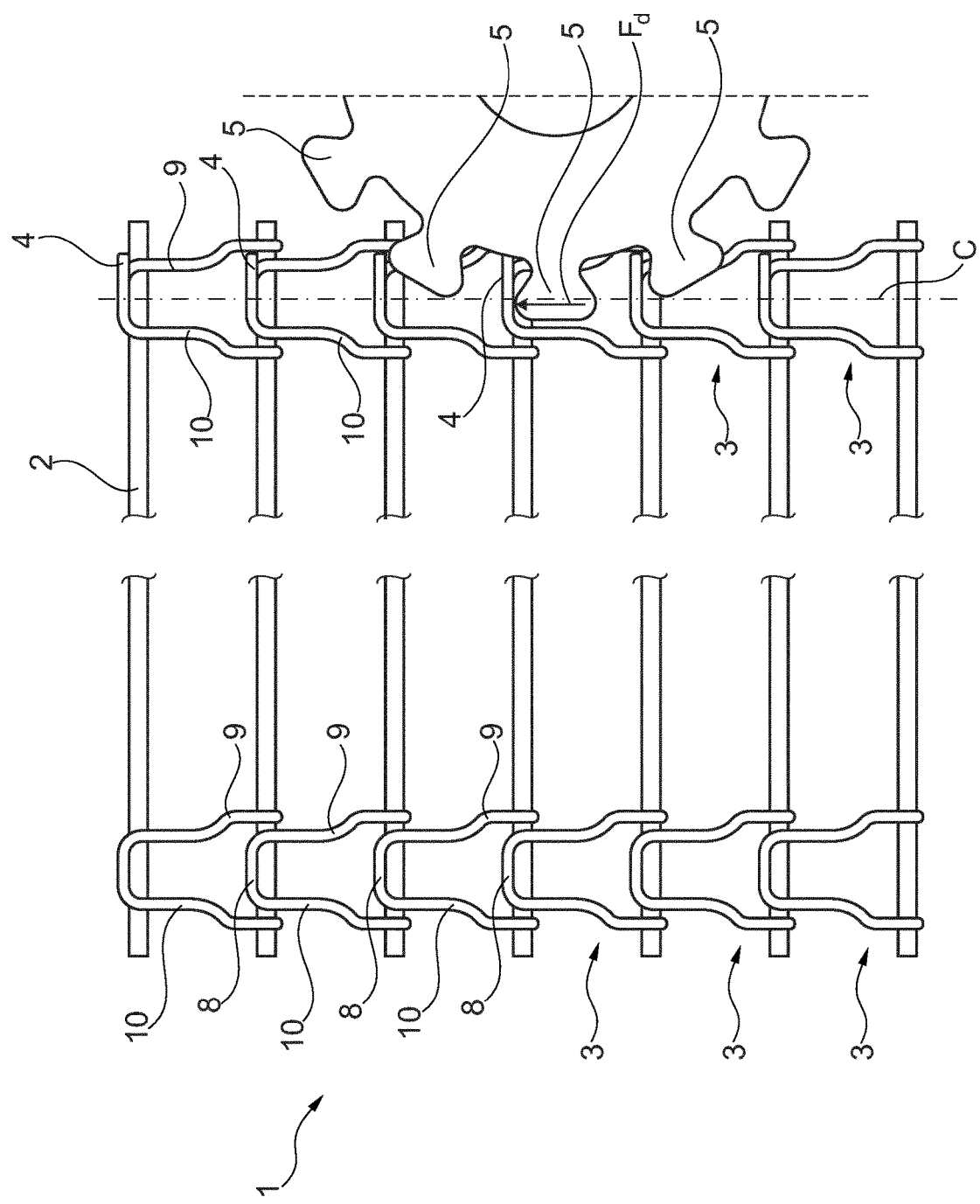
FIG. 4 shows a vertical top view of the combination according to FIG. 1.

FIG. 4 shows a top view of the combination 1 as shown in FIG. 1. This figure shows the conveyor belt formed by spaced apart rods 2 and interconnected links 3 on both ends of the rods.

As is clear from this figure, the drive force $F_d$ is virtually in line with the centerline C of the links 3. This ensures that there is no torque generated in the rods 2. Together with the resulting force being in the same plane as the tension forces $F_t$, as described in conjunction with FIG. 3 (in lateral view) no torque is generated in either lateral direction D and vertical direction V.

The invention claimed is:

1. A conveyor belt comprising a repeating interconnected arrangement of:
   rods spaced apart in a longitudinal direction and each extending in a lateral direction;
   connecting links arranged on both ends of the rods, wherein each of the links comprises a nose section extending in the lateral direction and two legs arranged on either side of the nose section, the legs extending in the longitudinal direction, wherein the nose section and the two legs provide a U-shaped structure, wherein laterally aligned first openings are arranged in each of the legs adjacent to the nose section for reception of one of the rods, wherein laterally aligned second openings are arranged in each of the legs adjacent the free ends of the legs, and wherein the first openings of a first link are aligned with the second openings of a second link for reception of one of the rods thereinto;

a first protrusion, for engagement with a first sprocket wheel, wherein the first protrusion is arranged to the nose section of each of the links, wherein the first protrusion extends in a vertical direction perpendicular to the longitudinal and lateral direction;

wherein a drive means comprise at least one first sprocket wheel, wherein the first sprocket wheel is in engagement with the first protrusions of the links of the conveyor belt and wherein an axle of the first sprocket wheel is arranged parallel to the vertical direction and wherein the first sprocket wheel is arranged below, seen in the lateral direction, the rods of the conveyor belt; and wherein the first protrusions are provided on the nose section, which coincides with the line along which the tension forces are transmitted by the interconnected links such that when the first protrusions are driven by the first sprocket wheel, the drive forces and the tension forces are applied in the same plane perpendicular to the rods, such that no torque is caused in the rods.

2. The conveyor belt according to claim 1, further comprising a second protrusion, for engagement with a second sprocket wheel, wherein the second protrusion is arranged on the opposite side relative to the first protrusion, seen in the vertical direction, to the nose section of each of the links and wherein the second protrusion extends in the vertical direction.

3. The conveyor belt according to claim 2, wherein the first protrusion extends or the first and second protrusions extend from the nose section along the leg adjacent to the middle of the conveyor belt.

4. The conveyor belt according to claim 2, wherein the first protrusion extends or the first and second protrusions extend from the nose section in a lateral direction away from the middle of the conveyor belt.

5. The conveyor belt according to claim 2, wherein the first protrusion is or the first and second protrusions are arranged at a regular interval to the links, on a first lateral side of the conveyor belt.

6. The conveyor belt according to claim 1, wherein the first openings are slot-shaped to allow relative movement between the adjacent links in the longitudinal direction.

7. The conveyor belt according to claim 2, wherein the links are shaped out of plate material and the nose section, the two legs, and the first and/or second protrusion have a uniform thickness.

8. The conveyor belt according to claim 1, wherein the drive means further comprise a second sprocket wheel, wherein the second sprocket wheel is in engagement with a second protrusion of the links, wherein an axle of the second sprocket wheel is coaxial with the axle of the first sprocket wheel and wherein the second sprocket wheel is arranged above, seen in the lateral direction, the rods of the conveyor belt.

* * * * *